(12) United States Patent
Francois

(10) Patent No.: US 7,668,639 B2
(45) Date of Patent: Feb. 23, 2010

(54) METHOD AND APPARATUS FOR OPTIMIZING THE PERFORMANCE ENVELOPE OF AN ENGINE

(75) Inventor: Daniel Francois, Salon de Provence (FR)

(73) Assignee: Eurocopter, Marignane (FR)

( * ) Notice: Subject to any disclaimer, the term of this patent is extended or adjusted under 35 U.S.C. 154(b) by 450 days.

(21) Appl. No.: 11/280,402

(22) Filed: Nov. 17, 2005

(65) Prior Publication Data
US 2008/0097703 A1    Apr. 24, 2008

(30) Foreign Application Priority Data
Nov. 25, 2004    (FR) ................................ 04 12532

(51) Int. Cl.
*G06F 19/00*    (2006.01)
(52) U.S. Cl. ................ 701/99; 701/3; 416/31; 416/35; 416/43; 416/44
(58) Field of Classification Search ............... 701/3, 701/29, 30, 100, 44; 416/31, 223, 1, 35, 416/43
See application file for complete search history.

(56) References Cited

U.S. PATENT DOCUMENTS

| | | | |
|---|---|---|---|
| 4,763,285 A | | 8/1988 | Moore et al. |
| 4,912,921 A | * | 4/1990 | Rice et al. ...................... 60/774 |
| 5,113,346 A | * | 5/1992 | Orgun et al. ................... 701/16 |
| 5,915,273 A | | 6/1999 | Germanetti |
| 5,986,580 A | * | 11/1999 | Permanne .................... 340/946 |
| 2001/0001033 A1 | * | 5/2001 | Karem ........................ 416/44 |
| 2003/0051461 A1 | | 3/2003 | Certain |
| 2003/0059303 A1 | | 3/2003 | Noussitou et al. |
| 2004/0123600 A1 | * | 7/2004 | Brunell et al. ................ 60/773 |
| 2004/0267395 A1 | * | 12/2004 | Discenzo et al. .............. 700/99 |

FOREIGN PATENT DOCUMENTS

| | | |
|---|---|---|
| FR | 2 602 270 | 2/1988 |
| FR | 2 749 545 | 12/1997 |
| FR | 2 803 051 | 6/2001 |
| FR | 2 827 636 | 1/2003 |

OTHER PUBLICATIONS

Patent Abstracts of Japan vol. 2003, No. 12, Dec. 5, 2003 & JP 2004 291805 A (Yamaha Motor Co Ltd), Oct. 21, 2004 abrège.

* cited by examiner

*Primary Examiner*—Tuan C To
*Assistant Examiner*—Redhwan Mawari
(74) *Attorney, Agent, or Firm*—Young & Thompson

(57) ABSTRACT

A method for doing an optimization of the performance envelope initially authorized for an existing rotorcraft engine (M) to enable the engine (M), to be used in an optimized performance envelope that is different from the performance envelope initially authorized for the engine, is remarkable in that this optimization is compensated by modifying the total service life of the engine (M).

20 Claims, 1 Drawing Sheet

METHOD AND APPARATUS FOR OPTIMIZING THE PERFORMANCE ENVELOPE OF AN ENGINE

BACKGROUND OF THE INVENTION

1. Field of the Invention

The present invention relates to a method and to apparatus for using a rotorcraft turboshaft engine in an optimized performance envelope that is different from the performance envelope initially authorized for the engine.

2. Description of the Related Art

Most rotorcraft presently being built have one or two free turbine engines. Power is taken from a low-pressure turbine referred to as a "free" turbine, which is mechanically independent of the compressor assembly and the high-pressure stage of the engine, which stage comprises a high-pressure turbine in particular. The free turbine of an engine generally rotates at a speed in the range 20,000 revolutions per minute (rpm) to 50,000 rpm, so a stepdown gearbox is needed for its connection to the main rotor of the rotorcraft, since its speed of rotation lies substantially in the range 200 rpm to 400 rpm: this is known as the main transmission gearbox.

The temperature limitations of an engine and the torque limitations of a main gearbox serve to define a performance envelope covering two normal utilization ratings for an engine arranged on a single- or twin-engined rotorcraft;

takeoff rating corresponding to a level of torque for the gearbox and to a level of temperature for the engine that can be accepted for a limited length of time without significant degradation: this is known as maximum takeoff power (PMD) and can be used for five minutes; and maximum continuous rating during which, at no time, are the capabilities of the gearbox exceeded or the capabilities of the engine exceeding relating to the maximum temperature that can be accepted continuously ahead of the high pressure blades of the first stage of the turbine: this is maximum continuous power (PMC) and it can be used without time limit, corresponding to about 90% of PMD.

On a twin-engined rotorcraft, the performance envelope also covers emergency ratings, for use only with one engine inoperative:

the first emergency rating during which the capabilities of the inlet stages of the gearbox and the temperature capabilities of the engine are used to the maximum: this rating can be used for a maximum of thirty consecutive seconds, and on three occasions in any one flight, it is equal to about 112% to 120% of PMD and is referred to in the art as super-emergency power (PSU). The use of PSU requires the engine to be removed and overhauled;

the second emergency rating in which the capabilities of the inlet stages of the gearbox and the temperature capabilities of the engine are used to a very great extent: this rating is equal to approximately 105% to 110% of PMD, it can be used for a maximum of two consecutive minutes, and it is referred to as maximum emergency power (PMU)

the third emergency rating during which the capabilities of the inlet stages of the gearbox and the temperature capabilities of the engine are used without inflicting damage: this is the intermediate emergency power equal to the PMD that can be used with one engine inoperative and can be used for the remainder of the flight, being referred to as PIU.

Consequently, the temperature and mechanical constraints, and above all the phenomenon of turbine blade creep, lead to the engine being degraded to a greater or lesser extent depending on the rating. To guarantee safety in flight and to obtain high performance, it is therefore essential to determine the maximum amount of damage that is acceptable for an engine.

Thereafter, the total service life of the engine is evaluated. In practice, this reduces to defining a maximum number of flying hours that the engine can perform between overhauls (or since its first use, depending on circumstances), and is referred to as time between overhauls (TBO). Once TBO has been reached, the engine is removed and overhauled.

For convenience in the text below, the term "most recent overhaul of the engine" is used to designate either first use of the engine or else the genuine most recent overhaul thereof.

Furthermore, in order for a rotorcraft to obtain authorization to fly in any given country, it is required that the performance envelope and the TBO of the engine(s) of the rotorcraft be certified by the official services in the country in question for a precise utilization spectrum. Such authorization is therefore achieved only after complete certification testing that is very expensive.

Since such complete certification tests of an engine are performed specifically to justify a performance envelope associated with a TBO, it is not possible to use the engine with a performance envelope different from the initially-authorized performance envelope, without performing new complete certification tests that are very expensive.

By way of example, it is found that the performance envelope of the type described above, associated with a TBO of about 2500 hours, corresponds to a utilization spectrum of a type that matches most civil applications. Nevertheless, for military applications or for certain particular missions, e.g. a rescue mission requiring winching into a helicopter, such an envelope can be insufficient. While on the contrary, in other situations, the envelope might be overdimensioned.

To remedy this problem, one solution would be to manufacture different engines dedicated to specific applications for a given rotorcraft airframe. However, given the cost of development, certification, and integration, that solution can be seen to be unsatisfactory. Production levels must be high in order to recover adequately the investment involved. That goes against the desired principle whereby a special performance engine is used on an existing rotorcraft in order to satisfy a particular need, which by its very nature implies short production runs.

SUMMARY OF THE INVENTION

Under such conditions, an object of the present invention is to provide a method and apparatus for optimizing the performance envelope initially authorized for an existing rotorcraft engine by performing additional tests only, and not complete testing.

It then becomes possible to use an existing rotorcraft that is intended for specific applications with an engine that was not initially designed for that purpose. Thus, the helicopter manufacturer can avoid the very large development costs associated with a new engine and can optimize the capabilities of an engine that has already been certified and proven, e.g. in civilian use.

According to the invention, a method for doing an optimization of the performance envelope initially authorized for an existing rotorcraft engine to enable said engine to be used in an optimized performance envelope that is different from said performance envelope initially authorized for said engine, is remarquable in that this optimization is compensated by modifying the total service life of said engine.

In addition, since the initially-authorized performance envelope covers at least one operating rating corresponding to a given power level and to a given utilization time, optimization consists in changing the power level and/or the utilization time for said rating.

Thereafter, the TBO associated with the initially-authorized performance envelope is no longer genuinely representative of the total service life of the engine. However, determining a new TBO for association in the future with the optimized performance envelope would be penalizing and unprofitable for the manufacturer from a financial point of view, since it would then be necessary to carry out certification testing again.

Thus, according to the invention, monitoring means are installed associated with calculating the real damage to the engine since the most recent overhaul. Compared with the initially-authorized performance envelope, use of the optimized performance envelope then takes place with equivalent safety levels since the real damage to the engine since its most recent overhaul is computed and monitored in real time during the flights performed using the engine of a rotorcraft.

To do this, in a first implementation, the following steps are performed:

calculating in real time instantaneous damage of said engine;

deducing from the instantaneous damage the real damage suffered by the engine since its most recent overhaul; and removing the engine for overhaul as soon as a first condition is satisfied indicating that the real damage is at its maximum, i.e. is equal to 1.

Consequently, this method enables the initially-authorized performance envelope to be optimized by modifying the total service life of the engine.

If the optimization consists in increasing performance, i.e. increasing power and/or the length of time a rating can be used or even creating a new rating, for example, then the consequence of implementing the optimized performance envelope is greater degradation of the engine compared with implementing the initially-authorized envelope. The total service life is no longer strictly equal to the TBO but to a duration that will be shorter, and that will be reached when the real damage reaches its maximum. Thus, the total service life becomes shorter than the TBO.

Nevertheless, if the engine is used in application of the initially authorized performance envelope, then its total service life will be equal to the TBO, since its real damage will reach its maximum at that time.

Similarly, if optimization consists in reducing the performance of the engine, then the real damage will not be at its maximum when the TBO is reached, thereby enabling the total service life of the engine to be increased.

In a second implementation seeking to increase safety, the TBO is retained for determining whether the total service life of the engine has been used up. Thus the following steps are performed:

calculating in real time the instantaneous damage of the engine;

from the instantaneous damage, deducing the real damage of the engine since its most recent overhaul;

determining whether a first condition is satisfied whereby the real damage is at its maximum;

measuring in real time the number of flying hours performed by the engine since its most recent overhaul;

determining whether a second condition is satisfied whereby said number of flying hours is equal to the engine's TBO; and removing the engine from the rotorcraft in order to overhaul it as soon as the first or the second condition is satisfied.

Advantageously, the instantaneous damage is evaluated from a deterioration coefficient obtained using a curve or any other similar means, such as a data table for example, that determines said deterioration coefficient as a function of the value of a monitored parameter of the engine.

In addition, for an engine provided with a high-pressure turbine upstream from a free turbine, the monitored parameter is the turbine entry temperature (TET), i.e. the temperature of the gas at the inlet to the high-pressure turbine.

The blades of the high-pressure turbine of the engine are subjected to centrifugal force and to the TET. Above a certain threshold, the material from which the blades are made begins to "creep", thereby lengthening the blades. This causes them to come into contact with the casing of the high-pressure turbine and thus be degraded. The TET is thus directly associated with engine degradation.

Nevertheless, since TET is very difficult to measure given its relatively non-uniform nature, the monitored parameter is preferably the temperature known as T4 in the art, i.e. the temperature of the gas at the inlet to the free turbine. This temperature is a good image of the TET and it is therefore likewise representative of engine degradation.

The present invention also provides apparatus for a rotorcraft provided with at least one engine and implementing the method of the invention. The apparatus is provided with management means for measuring in real time the number of flying hours performed by the engine of the rotorcraft since its most recent overhaul.

In addition, it advantageously includes a meter provided with a clock and a calculator for calculating the real damage of the engine.

The meter may be independent of or integrated in the management means.

Finally, display means are arranged in the rotorcraft cockpit so that the pilot is aware of the real damage and optionally of the number of flying hours that have elapsed since the most recent overhaul of the engine.

The apparatus of the invention thus makes it possible to optimize the performance envelope of the engine of a rotorcraft. Consequently there is no need to perform complete testing in order to obtain flying authorization for the rotorcraft as modified in this way. Simple additional tests suffice to demonstrate that the engine can accept the new ratings and/or the new power levels or utilization durations for existing ratings, and to establish the relationship on which the calculation of instantaneous damage is based. The cost of such additional testing comes to about 10% of the cost of developing a new engine, thus enabling the manufacturer to achieve a considerable saving.

BRIEF DESCRIPTION OF THE DRAWING FIGURES

The invention and its advantages appear in greater detail from the following description of a preferred implementation given without any limiting character and with reference to the accompanying drawing, in which.

DETAILED DESCRIPTION OF THE PREFERRED EMBODIMENTS

Figure 1:
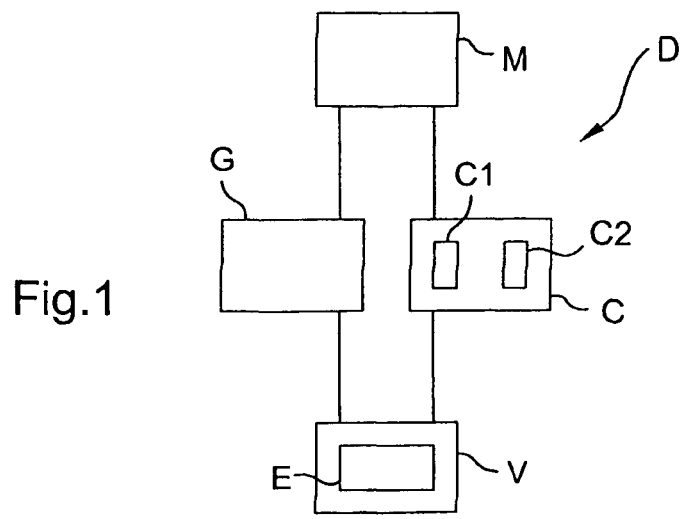
FIG. 1 is a block diagram of apparatus of the invention.

FIG. 1 is a block diagram of the apparatus D of the invention.

It comprises an engine M arranged on a twin-engined rotorcraft (not shown in FIG. 1) of known type. Initially, the engine M is certified to operate in a conventional civilian utilization spectrum. The performance envelope initially authorized for the engine M thus covers the various ratings mentioned above, i.e. the normal ratings and the first, second, and third super-contingency ratings.

In order to perform a rescue mission, it is often necessary to use a heavily equipped rotorcraft capable of having a long radius of action, or even capable of being refueled in flight. Such a rotorcraft thus presents high tonnage, thus requiring a takeoff rating using a level of power that is greater than the present power PMD.

In addition, in order to guarantee safety of a twin-engined rotorcraft while winching, it is preferable in emergency mode for the first emergency rating to be used continuously for a length of time that is greater than 30 seconds.

For a specific utilization spectrum, it can thus be necessary to define an optimized performance envelope for an engine that is different from the envelope initially authorized therefor.

By way of example, for a twin-engined rotorcraft, the following new normal ratings and/or new durations of utilization are obtained for each engine:
- optimized takeoff rating having takeoff power PMD' that is equivalent to the PMD but that can be used for 30 minutes;
- maximum continuous rating having a power PMC that is equal to 90% of PMD and that can be used without limit on duration; and
- an exceptional rating having an exceptional twin-engined power level, referred to as PEB for convenience, equal to 107% of PMD and usable for 5 minutes.

Similarly, when one of the two engines of the twin-engined rotorcraft is inoperative, the emergency ratings and their utilization times become, for example:
- third emergency rating usable without limitation on duration;
- optimized second emergency rating of power PMU' that is equivalent to PMU but usable for 15 minutes; and
- optimized first emergency rating of power PSU' that is equivalent to PSU but usable for 2 minutes plus two periods of 30 seconds.

The optimized performance envelope concerning these new ratings is given purely by way of example and could naturally be different depending on requirements.

Given this optimization, the engine runs the risk of degrading more quickly. The TBO as measured by management means G and normally representative of engine damage might now be over-evaluated. To avoid particularly onerous certification costs, the apparatus D includes a meter C for determining accurately the real damage to the engine.

The meter C has a clock C1 and a calculator C2 enabling it to determine the real amount of engine's damage by using a method that is explained below with reference to FIGS. 2 and 3.

In a first implementation, the engine M is removed for overhaul in the event of a first condition being satisfied, indicating that the real damage has reached its maximum.

Thus, since this optimized performance envelope inflicts more damage on the engine M than does the initially-authorized performance envelope, the total service life of the engine M is decreased since the real damage will reach its maximum level before the TBO is reached. Optimization of the initially-authorized performance envelope is thus compensated by a change, specifically a reduction, in the total service life of the engine M.

In a second embodiment, a second overhaul condition is established. It consists in verifying whether the number of flying hours performed by the engine M is equal to TBO.

Under these conditions, the engine M is overhauled as soon as either the first or the second condition is satisfied. Taking the second condition into account makes it possible to increase safety by ensuring redundancy for the monitoring means concerned with degradation of the engine M.

In addition, the apparatus of the invention includes display means V provided with a screen E, e.g. arranged in the cockpit of the rotorcraft. It displays the number of flying hours performed by the engine and also its real damage. Naturally, these two measurements are set to zero when the engine is used for the first time or after it has been overhauled, with this moment being referred to as the "most recent overhaul" in the present specification.

Figure 2:
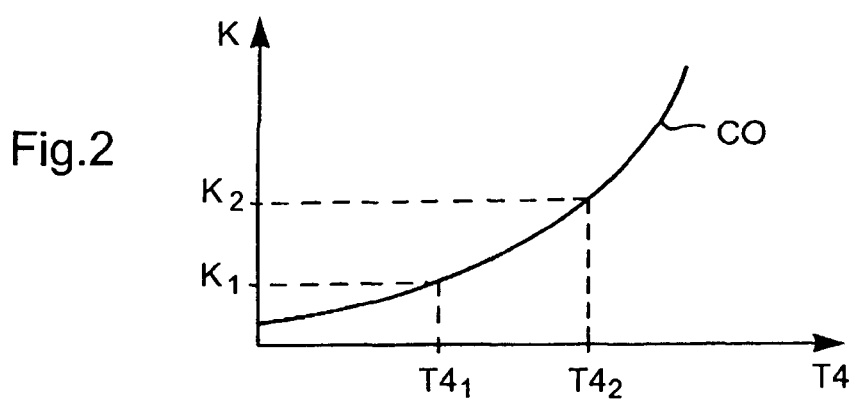
FIG. 2 is a graph showing the curve for determining the deterioration coefficient.

FIG. 2 is a graph plotting a curve CO that determines a deterioration coefficient K needed for calculating real damage. The value of a monitored parameter of the engine is plotted along the abscissa and the corresponding value of the deterioration coefficient K is plotted up the ordinate.

Preferably, for an engine including a free turbine, the monitored parameter is the temperature T4 of the gas at the inlet to the free turbine. This temperature T4 is indeed representative of the state of the engine since the main cause of damage to the engine is a temperature that is too high. The greater the temperature rise of the engine, the more it is degraded. This observation also explains the exponential shape of the curve CO.

Figure 3:
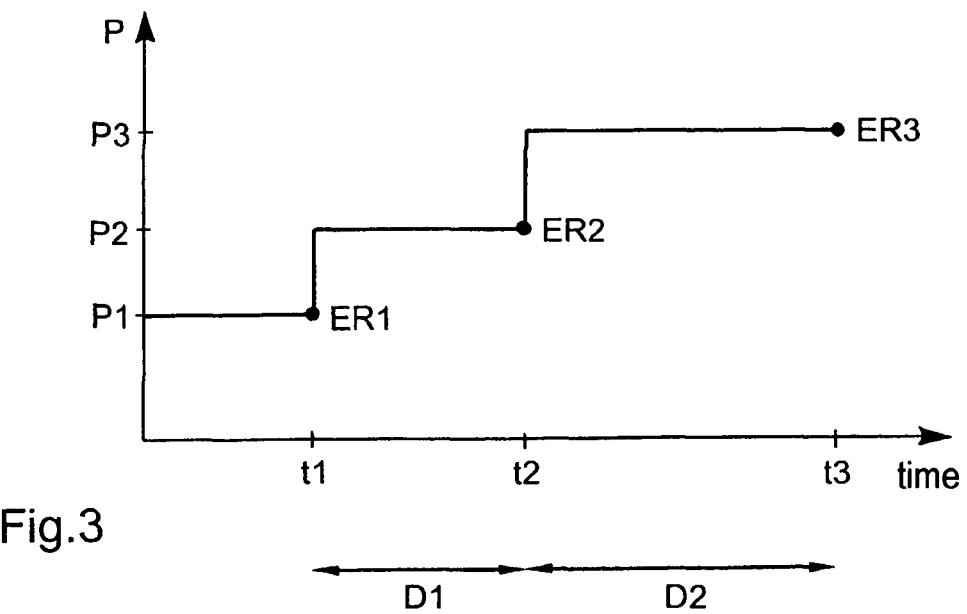
FIG. 3 is a graph for explaining how real damage is calculated.

FIG. 3 is a graph for explaining how real damage is calculated, with time being plotted along the abscissa and engine power up the ordinate.

At instant t1, the real damage is equal to ER1.

Under the action of the pilot, for example, the engine then changes from power P1 to power P2, corresponding to a T4 temperature of value $T4_1$. From the curve CO, or from any other equivalent means, the calculator C2 of the meter C deduces from this temperature the value K1 for the deterioration coefficient K and calculates the instantaneous damage by dividing K1 by TBO.

The calculator C2 then makes use of information from the clock C1 to establish the duration D1 during which the engine is at power P2 and consequently at temperature $T4_1$ at the inlet to its free turbine.

In order to determine the real damage ER2 at instant t2, and thus at the end of the duration D1, the calculator C2 multiplies the instantaneous damage by the duration D1 and adds the product to the value ER1 for the real damage at instant t1.

Similarly, with the engine delivering a power P3 from instant t2 to instant t3, for a duration D2 during which the monitored temperature has a value $T4_2$, the calculator C2 determines the real damage ER3 at instant t3 using the following relationship:

$$ER3 = ER2 + \frac{K2}{TBO} \times D2$$

In the first implementation, if the real damage ER3 at instant t3 is at the maximum, i.e. if it is equal to 1, then it will be necessary to remove the engine from the rotorcraft in order to overhaul it.

Nevertheless, in the second implementation, even if the real damage has not yet reached its maximum, an overhaul will be undertaken in the event of the number of flying hours of the engine reaching its TBO.

In addition, the apparatus D further includes a plurality of alarms that are operated by the management means G or by means not shown in the figures. These alarms are intended specifically to warn the pilot that:

- the length of utilization time for the rating in use has expired or is about to expire;
- the TBO of an engine has been reached or is about to be reached; and
- the real damage of an engine is at its maximum, or is about to reach its maximum.

Thus, as a function of the information presented, the rotorcraft pilot can select an operating rating that is adapted to the situation.

Finally, in order to simplify the apparatus D and reduce its size, in a first variant of the invention, the meter C is integrated in the management means G.

Similarly, in a second variant, the meter C is integrated in the display means V.

Naturally, the present invention can be implemented in a wide variety of ways. Although one implementation is described above, it will naturally be understood that it is not conceivable to identify all possible implementations exhaustively. It is naturally possible to envisage replacing any of the means described by equivalent means without thereby going beyond the ambit of the present invention.

The invention claimed is:

1. A method for optimization of a performance envelope which is used during a first time between overhauls initially authorized for an existing rotorcraft engine (M) to enable said engine (M) to be used in an optimized performance envelope which is used during a second time between overhauls that is different from said performance envelope initially authorized for said engine (M), comprising:

compensating said optimization by a change to a total service life of said engine using an apparatus that includes a meter provided with a clock and a calculator wherein a real damage at a current instant ER3 is determined by $ER3 = ER2 + K2/TBO \times D2,$ where ER2 is the real damage at a previous instant, K2 is a deterioration coefficient of said engine between said previous and the current instant, TBO is said first time between overhauls and D2 is a duration in which a monitored temperature has resulting from a power change between said previous and the current instant; and displaying a real damage on a display provided in a cockpit of the rotorcraft.

2. The method according to claim 1, wherein for said initially-authorized performance envelope comprising at least one operating rating corresponding to a given power level selected from the group consisting of a maximum takeoff power (PMD), a maximum continuous power (PMC) for a single-engine rotorcraft, a super-emergency power (PSU), a maximum emergency power (PMU), and an intermediate emergency power (PIU) for a multiengine rotorcraft, said PSU, PMU or PIU being utilized when one engine is inoperative for the multi engine rotorcraft, and to a given utilization time, said optimization is performed by modifying said power PMC, PMD, PIU, PMU, or PSU of said rating.

3. The method according to claim 1, wherein for said initially-authorized performance envelope comprising at least one operating rating corresponding to at least one given power selected from the group consisting of a maximum takeoff power (PMD), a maximum continuous power (PMC) for a single-engine rotorcraft, a super-emergency power (PSU), a maximum emergency power (PMU) and an intermediate emergency power (PIU) for a multiengine rotorcraft, said PSU, PMU or PIU being utilized when one engine is inoperative for the multiengine rotorcraft, and a given utilization time, said optimization is performed by modifying said utilization time of said rating.

4. The method according to claim 1, further comprising:
calculating in real time an instantaneous damage of said engine (M)
from said instantaneous damage, deducing a real damage of said engine since its most recent overhaul; and
removing said engine (M) from the rotorcraft in order to overhaul it as soon as a first condition is satisfied whereby said real damage is at its maximum amount.

5. The method according to claim 1, further comprising:
calculating in real time an instantaneous damage of said engine;
from said instantaneous damage, deducing a real damage of said engine (M) since its most recent overhaul;
determining whether said real damage is at its maximum amount;
measuring in real time a number of flying hours performed by said engine (M) since its most recent overhaul;
determining whether said number of flying hours is equal to the first time between overhauls (TBO) of said engine (M); and
removing said engine (M) from the rotorcraft to overhaul it as soon as said real damage is at its maximum amount or said number of flying hours is equal to the TBO is satisfied.

6. The method according to claim 4, wherein said instantaneous damage is calculated from the deterioration coefficient K2 obtained from a curve (CO) determining said deterioration coefficient K2 as a function of a value of a monitored parameter of said engine (M).

7. The method according to claim 6, wherein said engine (M) is provided with a high pressure turbine and said monitored parameter is a turbine entry temperature (TET) of a gas at an inlet to said high pressure turbine.

8. The method according to claim 6, wherein said engine (M) is provided with a free turbine, and said monitored parameter is a temperature (T4) of a gas at an inlet to a free turbine.

9. The method according to claim 5, wherein said instantaneous damage is calculated from the deterioration coefficient K2 obtained from a curve (CO) determining said deterioration coefficient K2 as a function of a value of a monitored parameter of said engine (M).

10. The method according to claim 9, wherein said engine (M) is provided with a high pressure turbine and said monitored parameter is a turbine entry temperature (TET) of a gas at an inlet to said high pressure turbine.

11. The method according to claim 9, wherein said engine (M) is provided with a free turbine, and said monitored parameter is a temperature (T4) of a gas at an inlet to the free turbine.

12. The method according to claim 2, wherein the PSU is equal to 112% to 120% of PMD.

13. The method according to claim 2, wherein the PMU is equal to 105% to 110% of PMD.

14. A method for optimizing a performance envelope of a rotorcraft engine (M), comprising:
    providing an initially-authorized performance envelope comprising at least one operating rating corresponding to a given power level selected from the group consisting of a maximum takeoff power (PMD), a maximum continuous power (PMC) for a single-engine rotorcraft, a super-emergency power (PSU), a maximum emergency power (PMU) and an intermediate emergency power (PIU) for a multiengine rotorcraft, said PSU, PMU or PIU being utilized when one engine is inoperative for the multiengine rotorcraft;
    calculating in real time an instantaneous damage of said engine (M); and
    from said instantaneous damage, deducing a real damage of said engine.

15. The method according to claim 14, wherein for a given utilization time, said optimization is performed by modifying said power PMC, PMD, PIU, PMU, or PSU of said rating.

16. The method according to claim 14, wherein for a given utilization time, said optimization is performed by modifying said utilization time of said rating.

17. The method according to claim 14, wherein the real damage is deduced for said engine since its most recent overhaul, and further comprising:
    removing said engine (M) from the rotorcraft in order to overhaul it as soon as a first condition is satisfied whereby said real damage is at its maximum amount.

18. The method according to claim 14, wherein the real damage is deduced for said engine since its most recent overhaul, and further comprising:
    determining whether said real damage is at its maximum amount;
    measuring in real time a number of flying hours performed by said engine (M) since its most recent overhaul;
    determining whether said number of flying hours is equal to a first time between overhauls (TBO) of said engine (M); and
    removing said engine (M) from the rotorcraft to overhaul it as soon as said real damage is at its maximum amount or said number of flying hours is equal to the TBO is satisfied.

19. The method according to claim 17, wherein a real damage at a current instant ER3 is determined by $$ER3 = ER2 + K2/\text{TBO} \times D2,$$

where ER2 is the real damage at a previous instant, K2 is a deterioration coefficient of said engine between said previous and the current instant, TBO is said first time between overhauls and D2 is a duration in which a monitored temperature has resulting from a power change between said previous and the current instant.

20. A method for optimization of a performance envelope which is used during a first time between overhauls initially authorized for an existing rotorcraft engine (M) to enable said engine (M) to be used in an optimized performance envelope which is used during a second time between overhauls that is different from said performance envelope initially authorized for said engine (M), comprising:
    compensating said optimization by a change to a total service life of said engine, using an apparatus that includes a meter provided with a clock and a calculator
    wherein at instant t1, a real damage is equal to ER1, and when the engine (M) changes from power P1 to power P2 corresponding to a temperature T4 of $T4_1$, a duration D1 for when the power is at P2, t2 is an instant corresponding to an end of the duration D1, and when a power P3 is delivered from instant t2 to instant t3, a real damage ER3 at an instant t3 is determined by
    ER3=ER2+K2/TBO×D2,
    where ER2 is the real damage at the previous instant t2, K2 is a deterioration coefficient of said engine between said previous instant and a current instant, TBO is the first time between overhauls and D2 is a duration in which a monitored temperature has a value of $T4_2$ arising from p3 resulting from a power change between said previous and the current instant.

* * * * *

UNITED STATES PATENT AND TRADEMARK OFFICE
CERTIFICATE OF CORRECTION

| | | |
|---|---|---|
| PATENT NO. | : 7,668,639 B2 | Page 1 of 1 |
| APPLICATION NO. | : 11/280402 | |
| DATED | : February 23, 2010 | |
| INVENTOR(S) | : Daniel Francois | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this

Twenty-eighth Day of December, 2010

David J. Kappos
*Director of the United States Patent and Trademark Office*